(12) United States Patent
Ciccone

(10) Patent No.: US 7,329,117 B2
(45) Date of Patent: Feb. 12, 2008

(54) INJECTION MOLDING NOZZLE TIP

(75) Inventor: Vince Ciccone, Kleinburg (CA)

(73) Assignee: Injectnotech Inc., Mississauga, Ontario (CA)

( * ) Notice: Subject to any disclaimer, the term of this patent is extended or adjusted under 35 U.S.C. 154(b) by 249 days.

(21) Appl. No.: 11/286,266

(22) Filed: Nov. 22, 2005

(65) Prior Publication Data

US 2006/0113407 A1 Jun. 1, 2006

Related U.S. Application Data

(60) Provisional application No. 60/630,266, filed on Nov. 22, 2004.

(51) Int. Cl.
*B29C 45/20* (2006.01)
(52) U.S. Cl. .................. 425/549; 264/328.15
(58) Field of Classification Search ........ 425/549; 264/328.15
See application file for complete search history.

(56) References Cited

U.S. PATENT DOCUMENTS

| | | | | |
|---|---|---|---|---|
| 2,529,146 A | * | 11/1950 | Feitl | 425/549 |
| 5,324,191 A | * | 6/1994 | Schmidt | 425/549 |
| 6,009,616 A | * | 1/2000 | Gellert | 425/549 |
| 6,960,073 B2 | * | 11/2005 | Bazzo et al. | 425/549 |

* cited by examiner

Primary Examiner—Tim Heitbrink
(74) Attorney, Agent, or Firm—Townsend and Townsend and Crew LLP

(57) ABSTRACT

A series of injection molding nozzles, one series having a two-piece nozzle (for use with a conventional nozzle housing), another series having a three-piece nozzle (for use with a conventional nozzle housing), and yet another series having a two-piece nozzle (for use with modified nozzle housing). The two-piece nozzles include either a nozzle insert with a sealing surrounding piece portions (when used with a conventional nozzle housing), or an inner insert with an outer insert portions (when used with modified nozzle housings). The three-piece nozzles include an inner insert, an outer insert and a sealing surrounding piece portions. The modified nozzle housings include a press-fit frontal insert. The nozzles form multiple seals with the nozzle housing and reduce heat loss by unique geometric and material combinations.

29 Claims, 16 Drawing Sheets

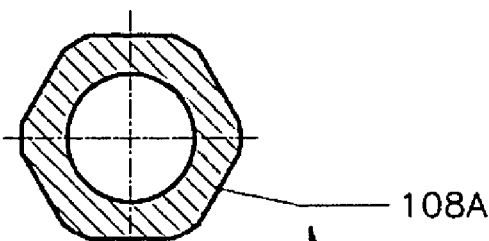
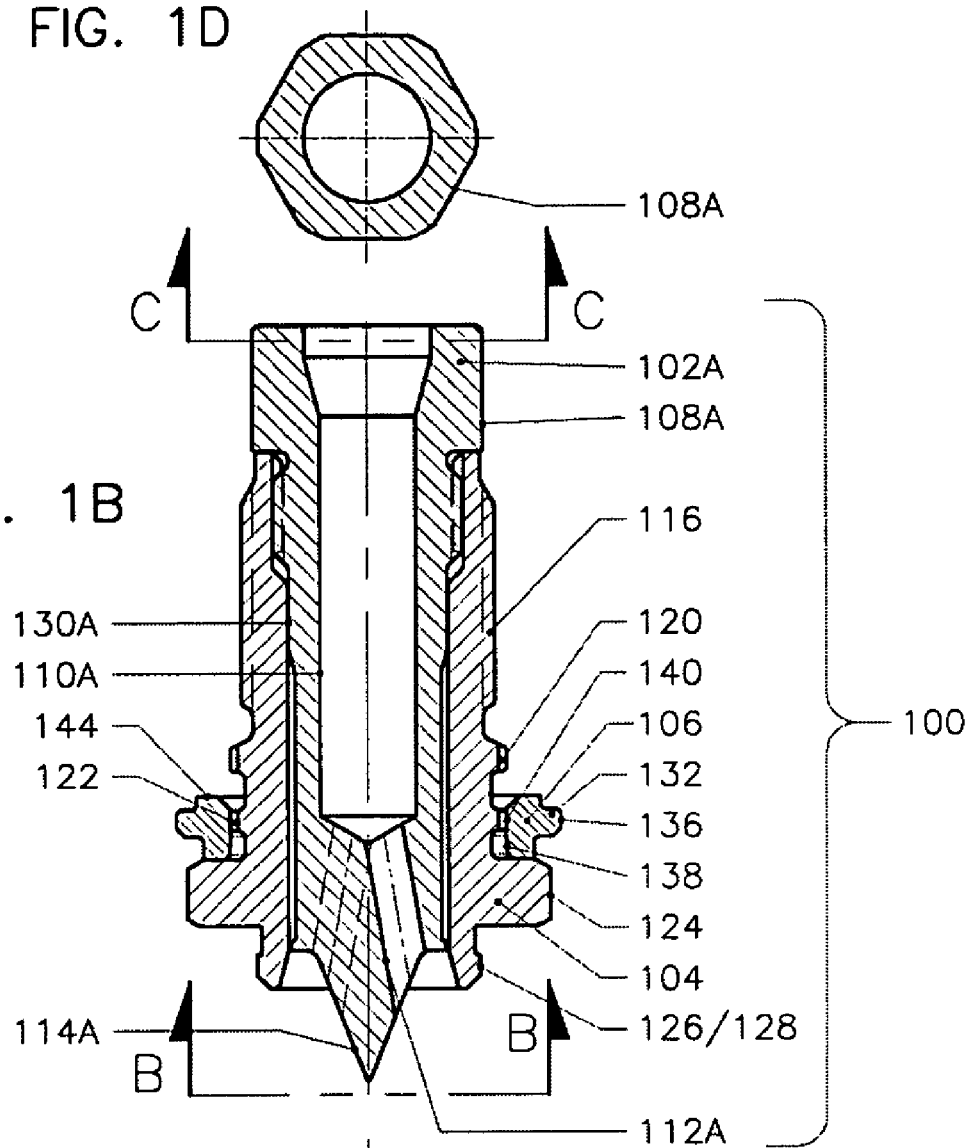
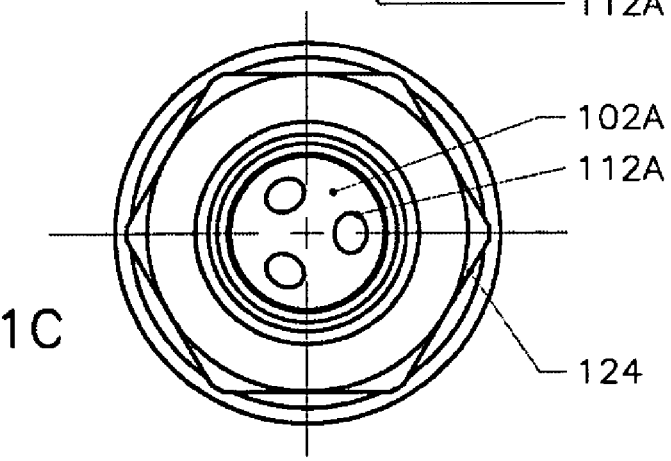

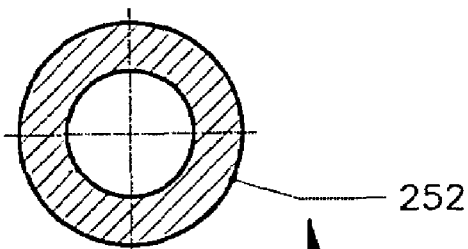
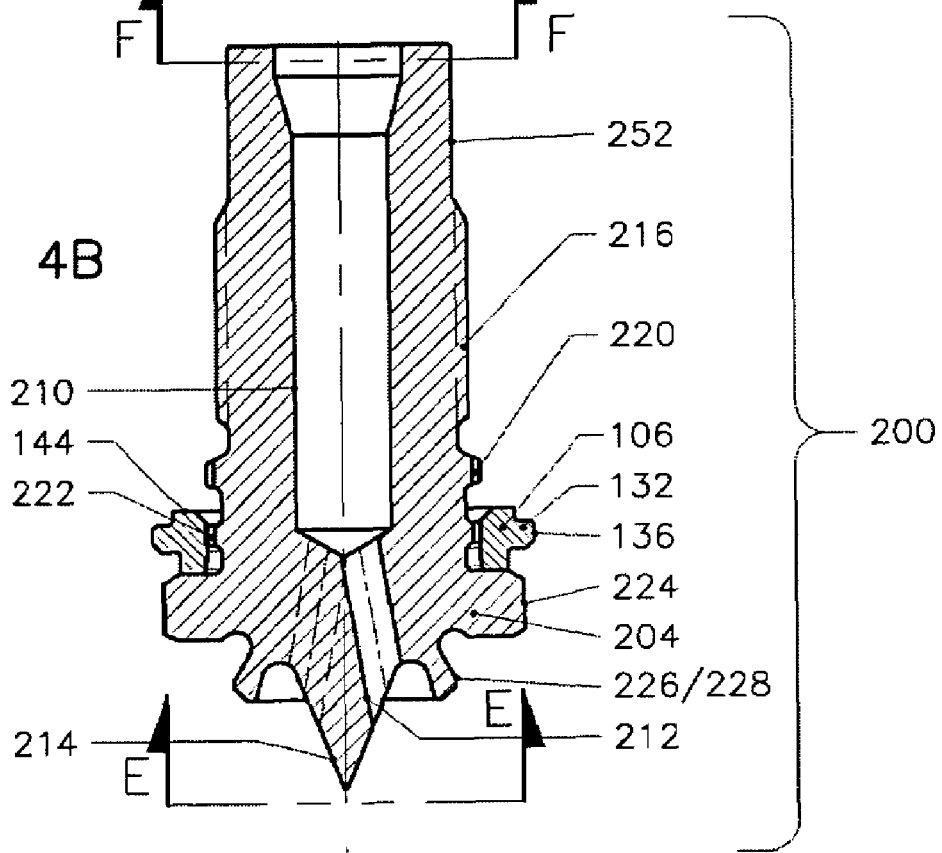
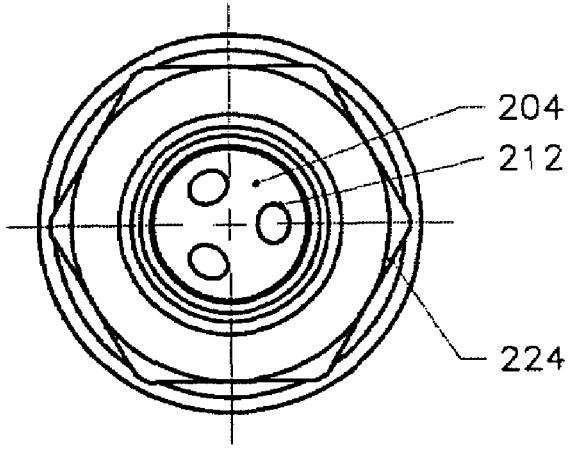

INJECTION MOLDING NOZZLE TIP

CROSS-REFERENCES TO RELATED APPLICATIONS

This application claims priority to U.S. Provisional Patent Application No. 60/630,266, filed Nov. 22, 2004, the disclosure of which is hereby incorporated by reference herein in its entirety for all purposes.

BACKGROUND OF THE INVENTION

The present invention relates to plastic injection molds, and in particular, to nozzles for the hot runner system of such injection molds.

BRIEF SUMMARY OF THE INVENTION

The present invention is directed towards a series of injection molding nozzles, one series having a two-piece nozzle (for use with a conventional nozzle housing), another series having a three-piece nozzle (for use with a conventional nozzle housing), and yet another series having a two-piece nozzle (for use with modified nozzle housing). The two-piece nozzles include either a nozzle insert with a sealing surrounding piece portions (when used with a conventional nozzle housing), or an inner insert with an outer insert portions (when used with modified nozzle housings). The three-piece nozzles include an inner insert, an outer insert and a sealing surrounding piece portions. The modified nozzle housings include a press-fit frontal insert. As used herein, the term conventional refers to an unmodified variant of the piece, for example a conventional housing is an unmodified one.

For a further understanding of the nature and advantages of the invention, reference should be made to the following description taken in conjunction with the accompanying drawings.

BRIEF DESCRIPTION OF THE DRAWINGS

FIG. 1B is an exemplary vertical sectional view of a first embodiment of an injection molding nozzle in accordance with the present invention, showing an assembled three-piece injection molding nozzle having a diverted-flow tip, a conventional primary seal and a conventional sealing surrounding piece, for use with a conventional nozzle housing, shown removed from the mold pocket.

FIG. 1C is an exemplary horizontal view along line B-B of FIG. 1B.

FIG. 1D is an exemplary horizontal sectional view along line C-C of FIG. 1B.

FIG. 4B is an exemplary vertical sectional view of a second embodiment of an injection molding nozzle in accordance with the present invention, showing an assembled two-piece injection molding nozzle having a diverted-flow tip, a conventional primary seal and a conventional sealing surrounding piece providing the secondary seal, for use with a conventional nozzle housing, shown removed from the mold pocket.

FIG. 4C is an exemplary horizontal view along line E-E of FIG. 4B.

FIG. 4D is an exemplary horizontal sectional view along line F-F of FIG. 4B.

FIG. 5C is an exemplary horizontal view along line H-H of FIG. 5B.

DETAILED DESCRIPTION OF THE INVENTION

The first embodiment of the present invention presents a three-piece injection-molding nozzle used with a conventional nozzle housing. As used herein, the term conventional refers to an unmodified variant of the piece, for example a conventional housing is an unmodified one, or a conventional seal is an unmodified seal.

Figure 1:
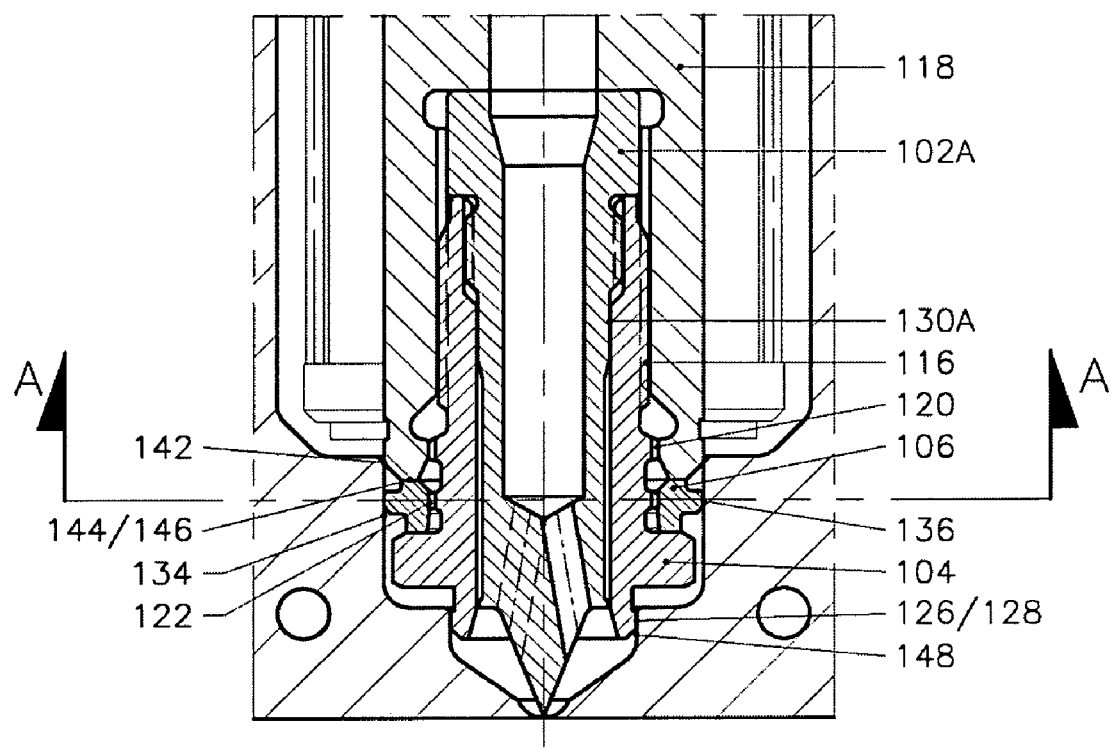
FIG. 1 is an exemplary vertical sectional view of a first embodiment of an injection molding nozzle in accordance with the present invention, showing an assembled three-piece injection molding nozzle having a diverted-flow tip, a conventional primary seal and a conventional sealing surrounding piece providing the secondary seal, used with a conventional nozzle housing, shown in the mold pocket.
Figure 1A:
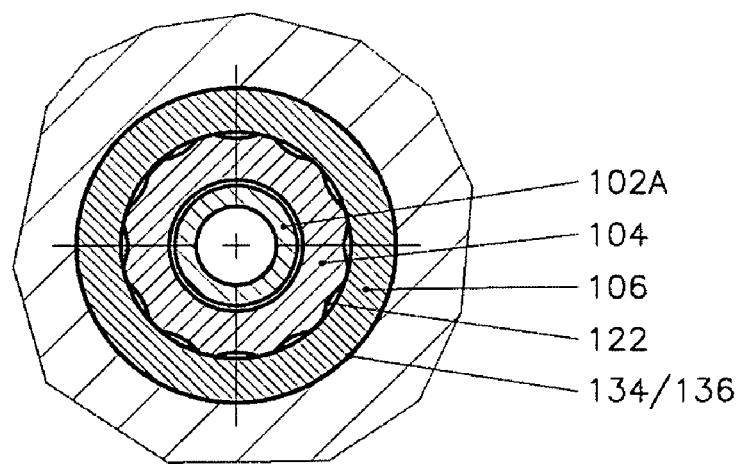
FIG. 1A is an exemplary horizontal sectional view along line A-A of FIG. 1.
Figure 1E:
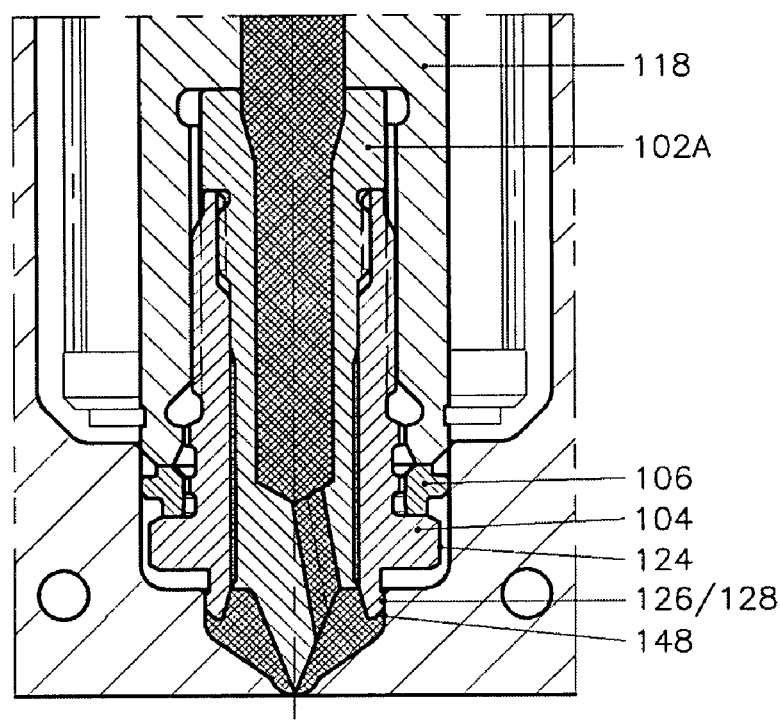
FIG. 1E is an exemplary vertical sectional view of a first embodiment of an injection molding nozzle in accordance with the present invention, showing an assembled three-piece injection molding nozzle having a diverted-flow tip, a conventional primary seal and a conventional sealing surrounding piece providing the secondary seal, used with a conventional nozzle housing, shown in the mold pocket during injection.
Figure 1F:
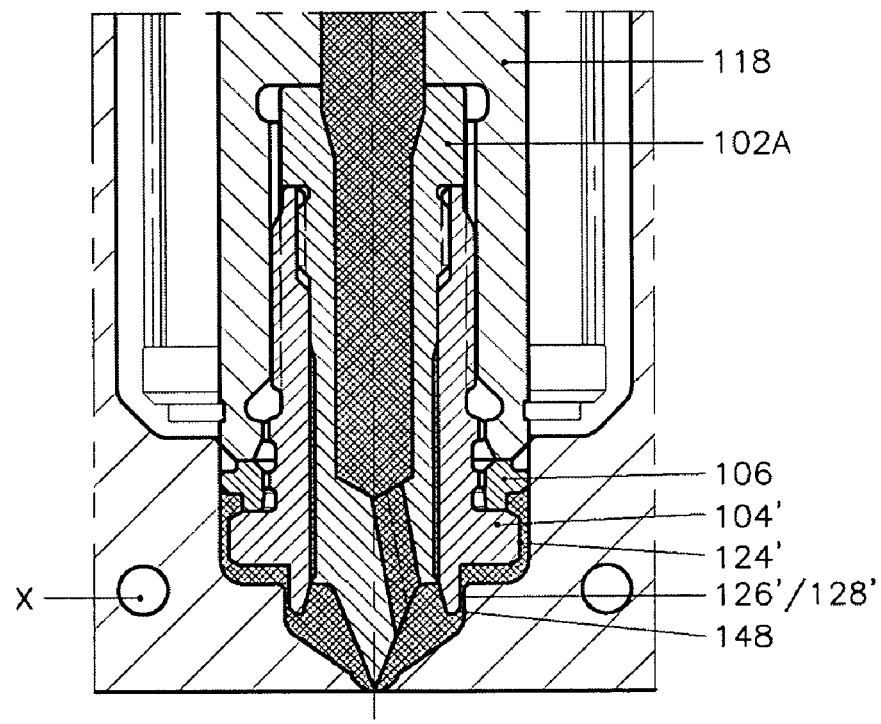
FIG. 1F is an exemplary vertical sectional view of a first embodiment of an injection molding nozzle in accordance with the present invention, showing an assembled three-piece injection molding nozzle having a diverted-flow tip, modified primary seal (allowing formation of additional insulation) and conventional sealing surrounding piece providing the secondary seal, used with a conventional nozzle housing, shown in the mold pocket during injection.
Figure 1G:
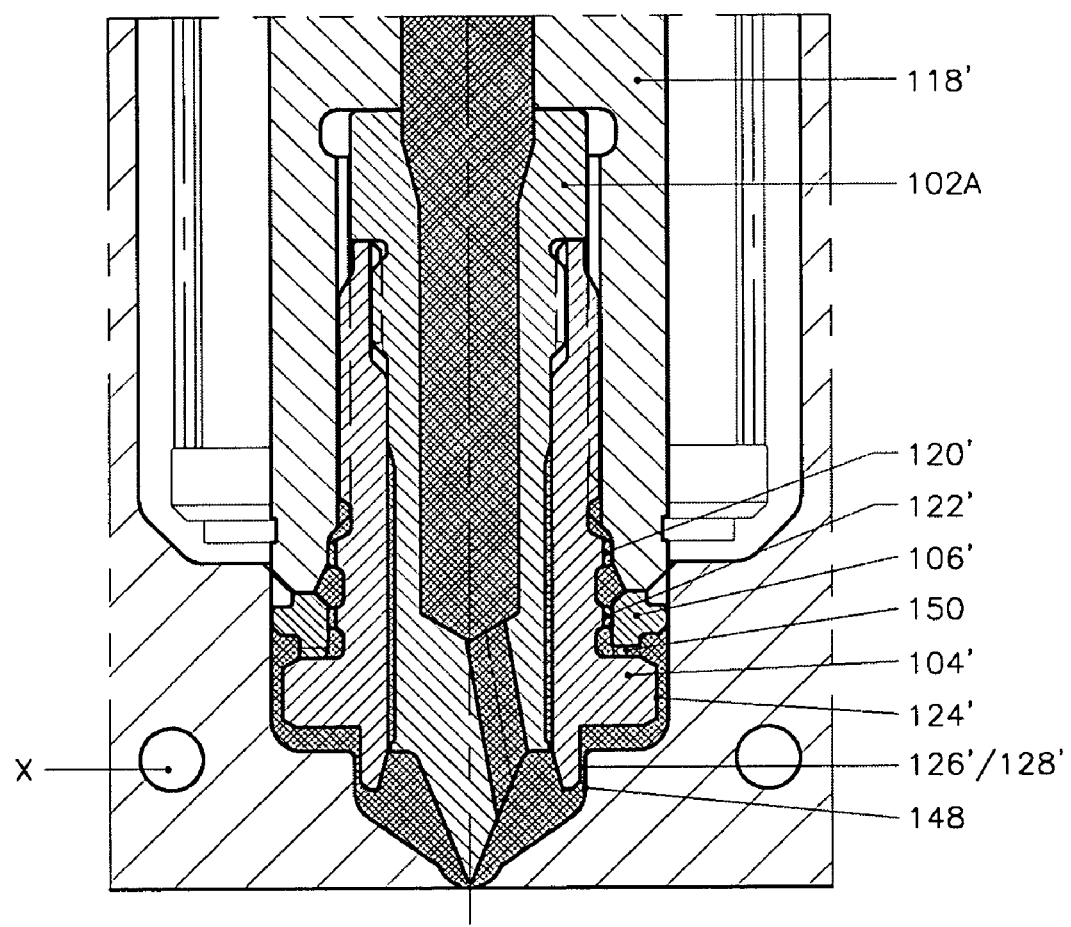
FIG. 1G is an exemplary vertical sectional view of a first embodiment of an injection molding nozzle in accordance with the present invention, showing an assembled three-piece injection molding nozzle having a diverted-flow tip, a modified primary seal (allowing formation of additional insulation) and a modified sealing surrounding piece (allowing formation of extended additional insulation), used with a second-conventional nozzle housing, shown in the mold pocket during injection.

FIGS. 1, 1B, 1E, 1F and 1G are exemplary vertical sectional views of a first embodiment of an injection molding nozzle in accordance with the present invention showing an assembled three-piece injection molding nozzle 100 having a diverted-flow tip. As is shown in FIGS. 1 through 1E, the nozzle insert of this design is made of three components: an inner insert 102A (diverted-flow style), an outer insert 104 (having a conventional primary seal), and a conventional sealing surrounding piece 106. FIG. 1F presents a three-piece nozzle tip similar to the one of FIGS. 1 through 1E, but one that has a modified primary seal on the outer insert, allowing formation of an additional insulator. FIG. 1G presents a three-piece nozzle tip similar to the one of FIG. 1F, which has a modified sealing surrounding piece which allows formation of an extended additional insulator. These modified seals are described in more detail below. For FIGS. 1 through 1F, the inner and outer inserts are made of the same or similar materials (with high thermal conductivity, such as beryllium copper alloys), while the sealing surrounding piece can be made of either the same or similar material as the inner and outer inserts, or of a harder, more wear-resistant alloy.

Figure 2:
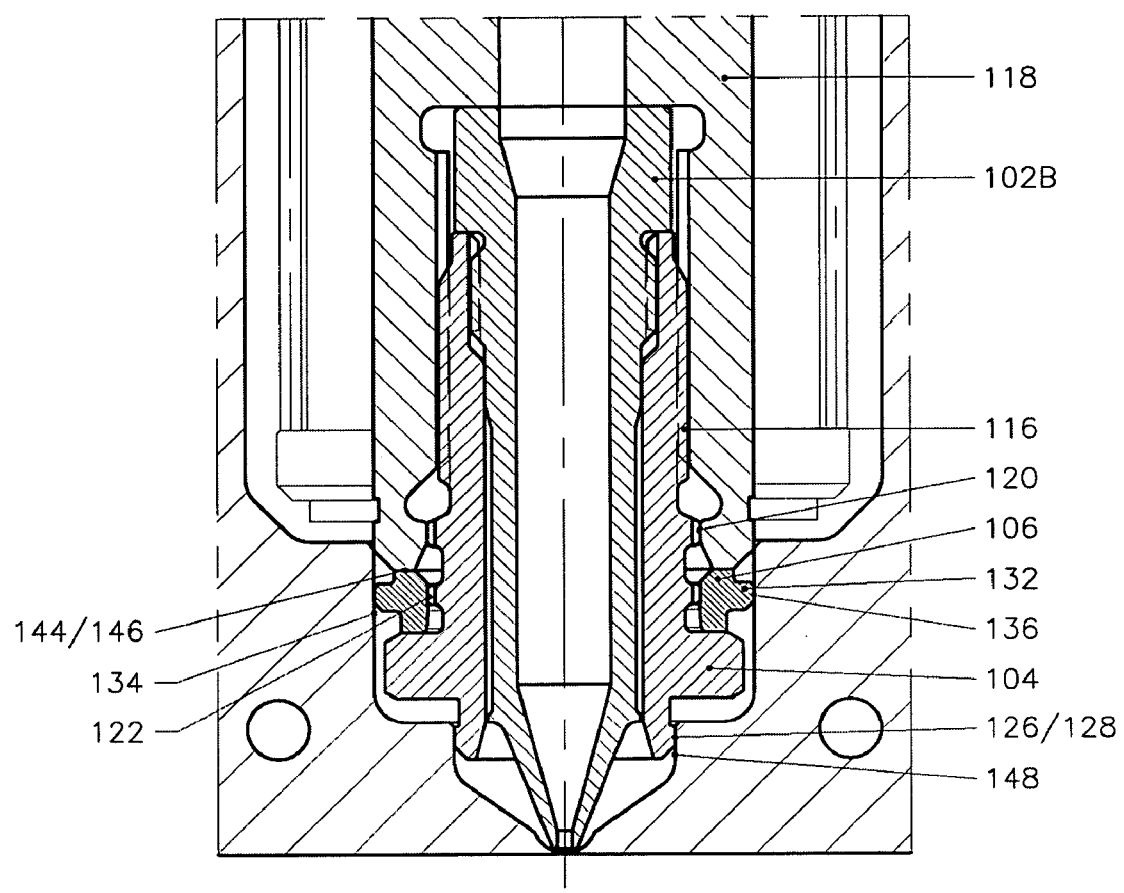
FIG. 2 is an exemplary vertical sectional view of a first embodiment of an injection molding nozzle in accordance with the present invention, showing an assembled three-piece injection molding nozzle having a flow-through tip, a conventional primary seal and a conventional sealing surrounding piece providing the secondary seal, used with a conventional nozzle housing, shown in the mold pocket.
Figure 2A:
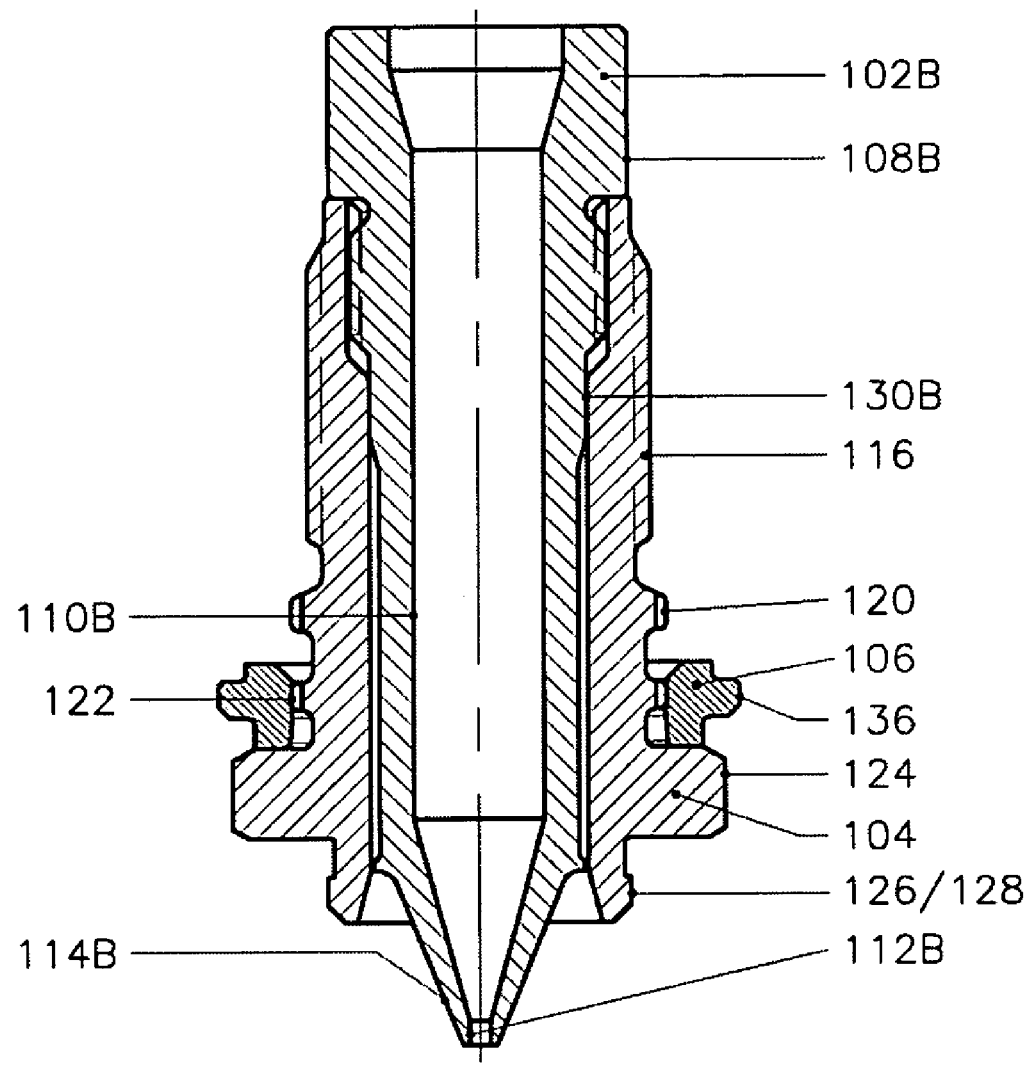
FIG. 2A is an exemplary vertical sectional view of a first embodiment of an injection molding nozzle in accordance with the present invention, showing an assembled three-piece injection molding nozzle having a flow-through tip, a conventional primary seal and a conventional sealing surrounding piece providing the secondary seal, for use with a conventional nozzle housing, shown removed from the mold pocket.
Figure 2B:
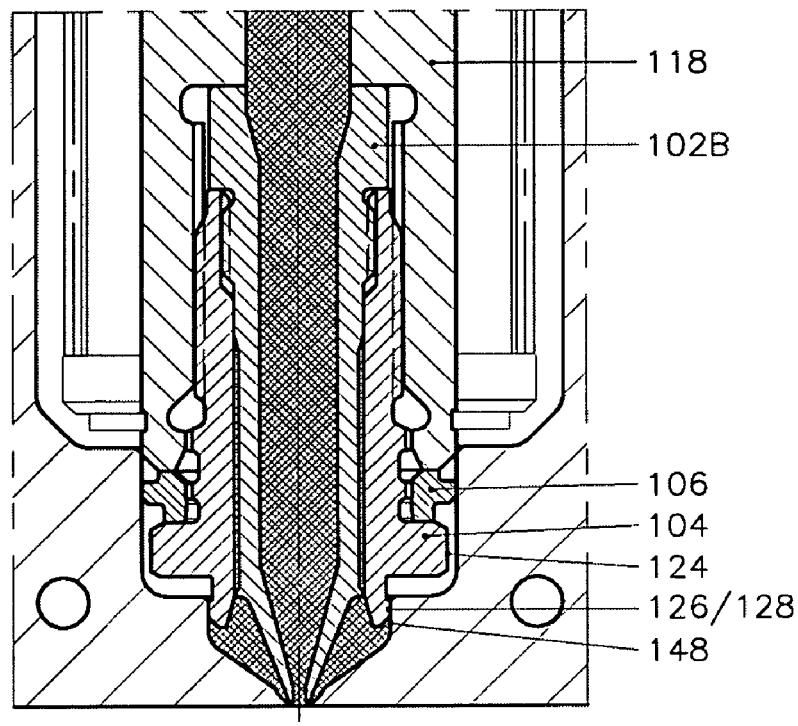
FIG. 2B is an exemplary vertical sectional view of a first embodiment of an injection molding nozzle in accordance with the present invention, showing an assembled three-piece injection molding nozzle having a flow-through tip, a conventional primary seal and a conventional sealing surrounding piece providing the secondary seal, used with a conventional nozzle housing, shown in the mold pocket during injection.
Figure 2C:
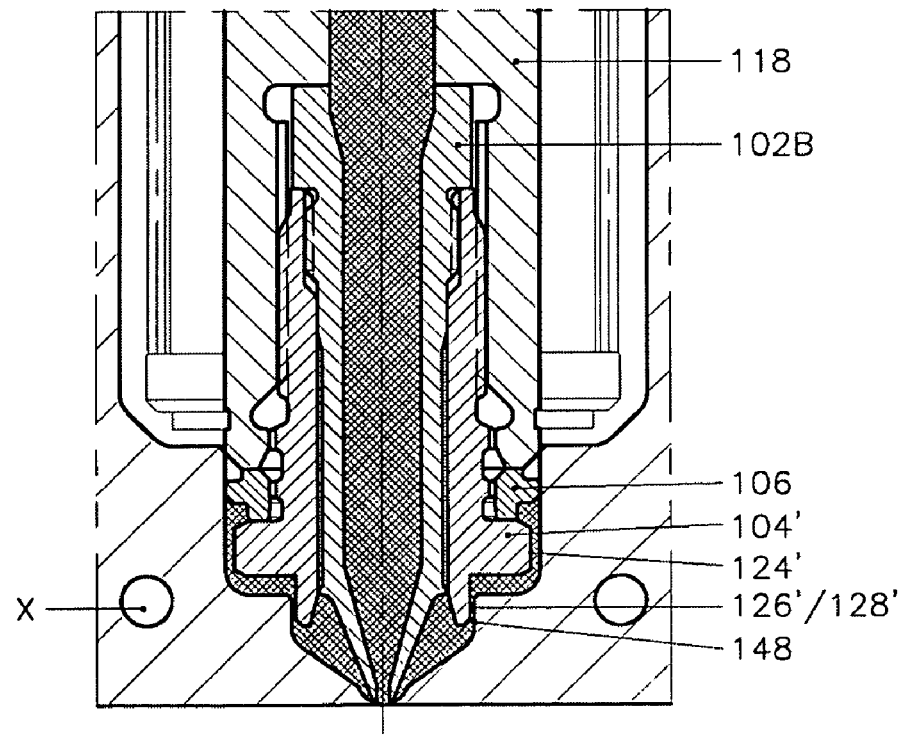
FIG. 2C is an exemplary vertical sectional view of a first embodiment of an injection molding nozzle in accordance with the present invention, showing an assembled three-piece injection molding nozzle having a flow-through tip, a modified primary seal (allowing formation of additional insulation) and a conventional sealing surrounding piece providing the secondary seal, used with a conventional nozzle housing, shown in the mold pocket during injection.

The back end of the inner insert 102A has a shape designed for torquing, such as for example a hexagon head 108A as shown in FIG. 1D. The inner insert 102A is threadably engaged in the outer insert 104. On the inside, the diverted-flow inner insert has a large central duct 110A, from which a number of smaller holes 112A (usually three evenly-spaced holes, as shown in FIG. 1C) extend to the conical end of tip 114A. The flow-through style inner insert 102B (as shown in FIGS. 2 through 2C) has a large central duct 10B, tapering off to a small central hole 112B at the conical end of the tip 114B. FIGS. 2 through 2B show an outer insert with a conventional primary seal, while FIG. 2C shows an outer insert with a modified primary seal. The seal embodiments are described below.

As shown in FIGS. 1 through 1E, on the outside the outer insert has a threaded portion 116 for engagement in a conventional nozzle housing 118, followed by a first scalloped portion 120 for centering in the conventional nozzle housing, a second scalloped portion 122 for centering of the conventional sealing surrounding piece 106, a portion shaped for torque such as hexagon 124, and a small cylindrical portion 126 which constitutes the conventional primary seal 128. Centering between the inner and outer inserts takes place on the cylindrical surface 130A of contact between them.

The conventional sealing surrounding piece 106 has an outer cylindrical flange 132. This flange comes in contact with the mold pocket 134, creating the secondary seal 136. While the sealing surrounding piece 106 can have a singular, outer cylindrical diameter, the flanged design has the purpose of reducing the surface of contact between the sealing surrounding piece and the mold pocket, in order to reduce heat loss from the nozzle insert to the mold pocket, through the sealing surrounding piece. The flanged sealing surrounding piece 106 is used with the first and second embodiments of the present invention. However, various other shapes can be employed for the sealing surrounding piece, such as the ones shown with the third embodiment, described below.

On the inside, the conventional sealing surrounding piece 106 has a slightly tapered, guide-in portion 138, followed by a cylindrical portion 140. Contact between the outer insert's second scalloped portion 122 and the inner cylindrical portion 140 of the sealing surrounding piece 106 ensures centering between these two components. While the outer insert 104 could achieve such centering with a cylindrical surface, the scalloped profile is employed, again, with the purpose of reducing heat loss through the sealing surrounding piece 106. Similarly, centering of the outer insert 104 in the conventional nozzle housing 118 could take place on a continuous cylindrical locating surface (as provided by Top Grade Molds' U.S. Pat. No. 6,394,785, the teachings of which are herein incorporated by reference). In one embodiment, the outer insert 104 employs the first scalloped profile 120 to reduce heat loss through the nozzle housing. It should be understood that various designs of scalloped portions (other than the one shown) could be used, without departing from the scope of this invention. Such designs provide for reduced contact between the nozzle and the housing, by way of a series of curved or straight undulated projections forming a border, as compared to non-undulated or flat profiles.

The outer geometry of this nozzle tip unit is designed to allow interchangeability with older styles (when used with conventional nozzle housings), such as those offered by Top Grade Molds of Ontario, Canada, and described in U.S. Pat. No. 6,394,785. The interchangeability enables the new nozzle tips, with added features, to easily replace previous designs of tips when molds are overhauled or upgraded.

This first embodiment offers several advantages over existing injection molding nozzles. One advantage is that the nozzle tip 100 is pre-assembled and stocked as a one-piece unit. The press-fit engagement between the outer insert 104 and conventional sealing surrounding piece 106, which takes place on the second scalloped profile 122 of the outer insert 104, prevents the conventional sealing surrounding piece 106 from falling off the outer insert 104 during handling. Furthermore, this design presents a replaceable secondary seal (as part of the conventional sealing surrounding piece), which is used for mature molds. If, after repeated cleanings or overhauls, the mold pocket (where the secondary seal takes place) has been enlarged, sealing can be re-achieved by using an oversized replacement sealing surrounding piece, which eliminates the need to replace the whole nozzle tip in such cases. Also, the secondary seal has a longer life when the conventional sealing surrounding piece is made of a harder, more wear-resistant alloy.

In addition, the embodiment as described in conjunction with FIGS. 1 through 1E and 2 through 2B has a built-in double seal: the primary seal 128 at the front of the outer insert 104, and the secondary seal 136, on the flange portion 132 of the sealing surrounding piece 106, behind the hexagon portion 124 of the outer insert 104. Note: A further seal 142 (the third seal) is created after the heat-up of the nozzle, at the circular surface of contact between the conventional nozzle housing 118 and the mold pocket 134, similar to that provided by Top Grade Molds' U.S. Pat. No. 6,394,785.

The pre-assembled nozzle tip unit 100 can be taken off the shelf and threaded in the conventional nozzle housing 118, as shown in FIGS. 1, 1B and 2, until the back surface 144 of the conventional sealing surrounding piece 106 tightens against the front end 146 of the conventional nozzle housing 118. The sealing surrounding piece 106 becomes compressed between the outer insert 104 and the conventional nozzle housing 118, ensuring a leak-proof contact. Centering of the nozzle tip 100 in the conventional nozzle housing 118 takes place on the first scalloped portion 120 behind the secondary seal 136.

An adaptation of the first embodiment, presenting a modified primary seal 128', is shown in FIG. 1F. It makes use of inner insert 102A, outer insert 104' having a reduced cylindrical portion 126', and a conventional sealing surrounding piece 106, the nozzle tip being employed with a conventional nozzle housing 118. The modified primary seal 128' does not stop the molten plastic under injection pressure, but rather allows it to reach behind the reduced cylindrical portion 126', to fill the chamber around hexagon portion 124' all the way to the front of the conventional sealing surrounding piece 106. Cooling lines X crossing through the mold help solidify the plastic formed behind the reduced cylindrical portion 126'; this solidified plastic becomes an additional insulator, further reducing heat loss. The annular gap between the reduced cylindrical portion 126' and the mold pocket 148 is sufficiently small to prevent the plastic of the additional insulator from seeping back to the front of the nozzle tip, allowing for clean color changes. The pressure differential (injection pressure at the front of the nozzle tip is far higher than the pressure of the plastic of the additional insulator) also helps prevent such seepage. This design can also be used with inner insert 102B (flow-through design), as can be seen in FIG. 2C.

A further adaptation of the first embodiment, presenting a modified primary seal 128' and a modified sealing surrounding piece 106', is shown in FIG. 1G. The reduced cylindrical portion 126' of outer insert 104' allows flow of molten plastic behind hexagon portion 124', while a number of grooves 150 (machined onto the portion of the modified sealing surrounding piece 106' that is in contact with outer insert 104') allow the molten plastic to reach even further, between the outer insert 104' and the modified sealing surrounding piece 106'. The molten plastic travels past the scalloped profiles 122' and 120', reaching to the beginning of the threaded engagement (between outer insert 104' and second-conventional nozzle housing 118'), creating an extended additional insulator. This design can also be used with a flow-through style inner insert 102B.

Figure 3:
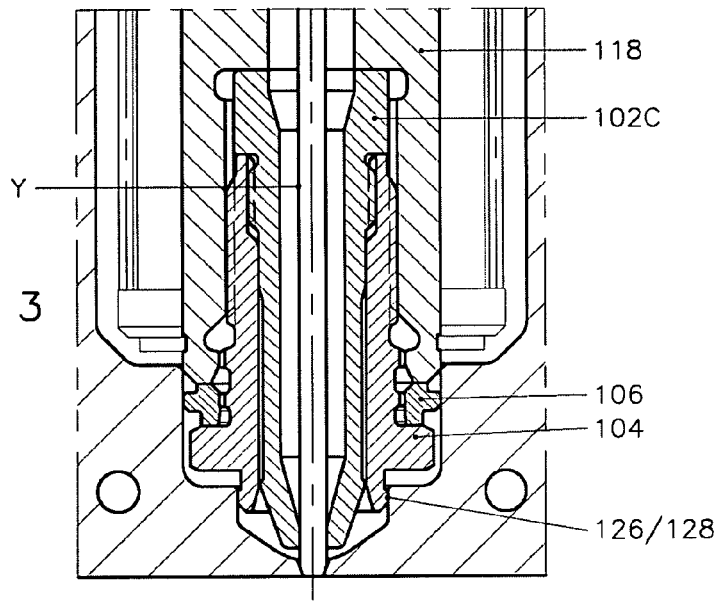
FIG. 3 is an exemplary vertical sectional view of a first embodiment of an injection molding nozzle in accordance with the present invention, showing an assembled three-piece injection molding nozzle having a valve-gate style tip, a conventional primary seal and a conventional sealing surrounding piece providing the secondary seal, used with a conventional nozzle housing, shown in the mold pocket.
Figure 3A:
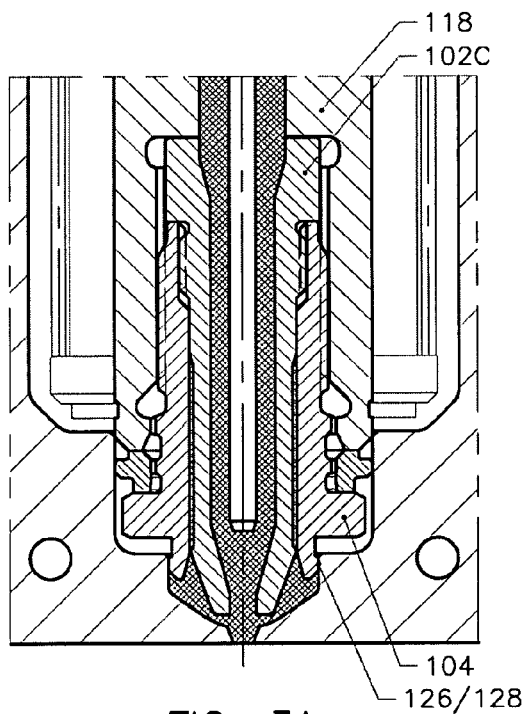
FIG. 3A is an exemplary vertical sectional view of a first embodiment of an injection molding nozzle in accordance with the present invention, showing an assembled three-piece injection molding nozzle having a valve-gate style tip, a conventional primary seal and a conventional sealing surrounding piece providing the secondary seal, used with a conventional nozzle housing, shown in the mold pocket during injection.
Figure 3B:
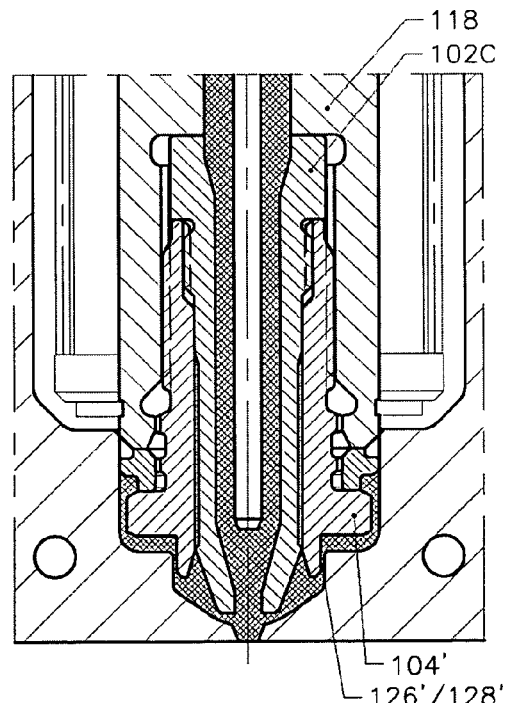
FIG. 3B is an exemplary vertical sectional view of a first embodiment of an injection molding nozzle in accordance with the present invention, showing an assembled three-piece injection molding nozzle having a valve-gate style tip, modified primary seal (allowing formation of additional insulation) and conventional sealing surrounding piece providing the secondary seal, used with conventional nozzle housing, shown in mold pocket during injection.

It should be noted that the inner and outer inserts of designs of FIGS. 2 through 2C, and also of FIGS. 3 through 3B, are made of the same or similar materials with high thermal conductivity (such as beryllium copper alloys), while the conventional sealing surrounding piece is made of either the same or similar material (as the inner and outer inserts) or of a harder, more wear-resistant alloy.

FIGS. 3, 3A and 3B show an adaptation of the first embodiment for use with a valve-gate style nozzle tip and with a conventional nozzle housing 118. FIGS. 3 and 3A employ a conventional primary seal 128; FIG. 3B uses a modified primary seal 128'.

The outer inserts 104, 104' and the conventional sealing surrounding piece 106 used are the ones previously described. The inner insert 102C is adapted for a valve-gate style seal with valve stem Y. As is typical of such gates, the valve stem is retracted by some means to allow flow of molten plastic into the injection chamber.

The modified primary seal 128' of FIG. 3B allows molten plastic to reach to the front of the conventional sealing surrounding piece 106, in a manner already described, providing an additional insulator to prevent further heat loss from nozzle tip to mold pocket. When used with a modified sealing surrounding piece 106', the molten plastic is allowed to reach even further (as previously explained), forming an extended additional insulator (not shown).

A second embodiment is described with reference to FIGS. 4 through 4F. As is shown in FIGS. 4 and 4B, the nozzle insert 200 of this design is made of two components: a one-piece insert 204 (e.g., with a diverted-flow style, and a conventional primary seal 228) and a conventional sealing surrounding piece 106 (as described in the first embodiment).

As shown in FIG. 4D, the one-piece insert 204 has a cylindrical portion 252, which is followed by an outer thread 216, a first scalloped portion 220 for centering in the conventional nozzle housing 118, a second scalloped portion 222 for centering of the conventional sealing surrounding piece 106, a hexagon portion 224 for torque, a small cylindrical portion 226 which constitutes the conventional primary seal 228, followed by the conical end of the tip 214. On the inside, the one-piece insert 204 has a large central duct 210, from which a number of smaller holes 212 (usually three evenly-spaced holes, as shown in FIG. 4C) extend to the conical end of tip 214, for the diverted-flow tip.

Figure 4:
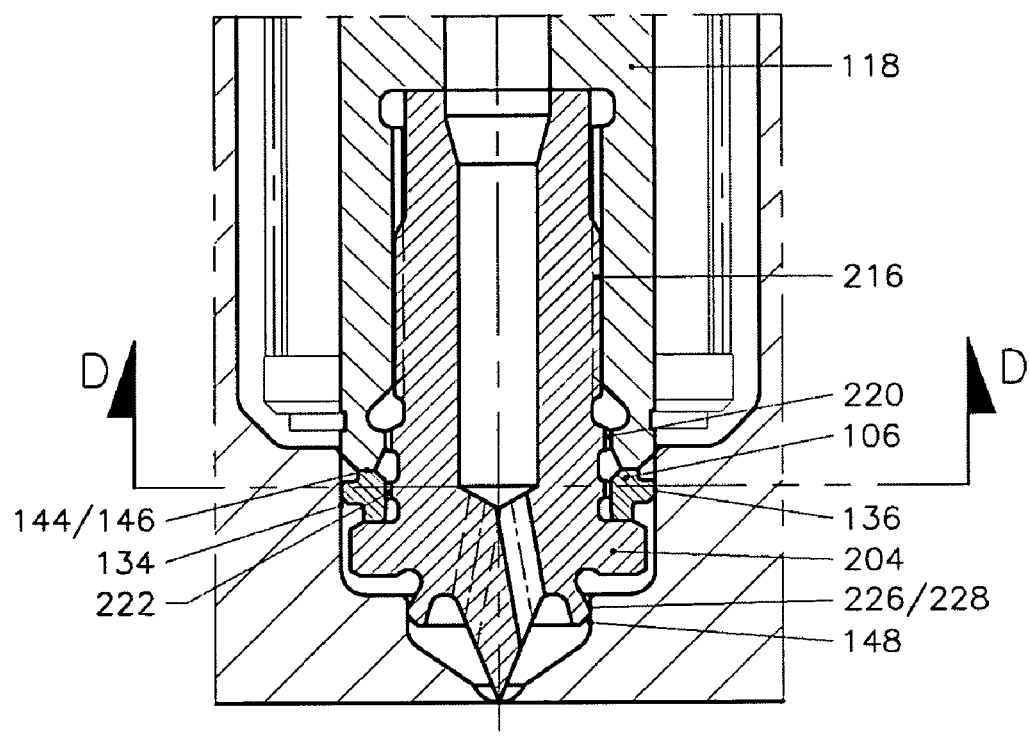
FIG. 4 is an exemplary vertical sectional view of a second embodiment of an injection molding nozzle in accordance with the present invention, showing an assembled two-piece injection molding nozzle having a diverted-flow tip, a conventional primary seal and a conventional sealing surrounding piece providing the secondary seal, used with a conventional nozzle housing, shown in the mold pocket.
Figure 4A:
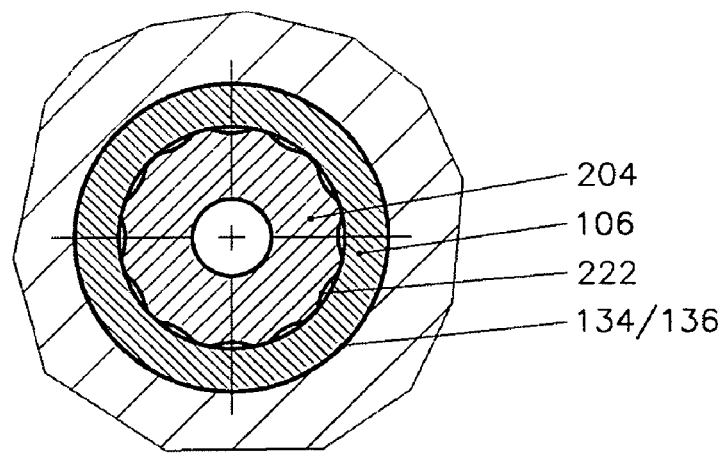
FIG. 4A is an exemplary horizontal sectional view along line D-D of FIG. 4.
Figure 4E:
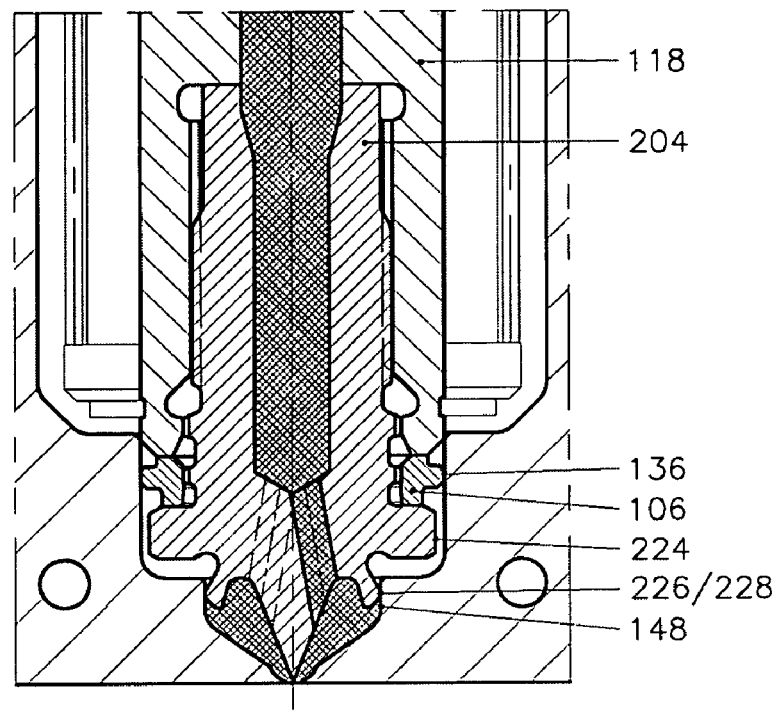
FIG. 4E is an exemplary vertical sectional view of a second embodiment of an injection molding nozzle in accordance with the present invention, showing an assembled two-piece injection molding nozzle having a diverted-flow tip, a conventional primary seal and a conventional sealing surrounding piece providing the secondary seal, used with a conventional nozzle housing, shown in the mold pocket during injection.

As shown in FIGS. 4 and 4B, the conventional sealing surrounding piece 106 is pre-installed onto the one-piece insert 204. The pre-assembled tip can be handled as a compact unit, with no loose components. It can be installed in the conventional nozzle housing 118 in a quick and easy manner, with a torque wrench applied onto the hexagon portion 224, until the back surface 144 of the conventional sealing surrounding piece 106 tightens against the front surface 146 of conventional nozzle housing 118. The conventional sealing surrounding piece 106 becomes compressed between insert 204 and conventional nozzle housing 118, ensuring a leak-proof contact.

An advantage of the second embodiment is the simplified construction of the nozzle tip. The manufacturing of a one-piece insert is simpler, requires less time and is more economical.

The presence of the conventional sealing surrounding piece as described offers the advantage of a replaceable secondary seal, reduced heat loss through the mold, and longer life when made of a harder, more wear-resistant alloy.

The second embodiment can also be used with a one-piece flow-through style tip (with a conventional or the modified primary seal), or with a one-piece valve-gate style tip (with the conventional or modified primary seal).

Figure 4F:
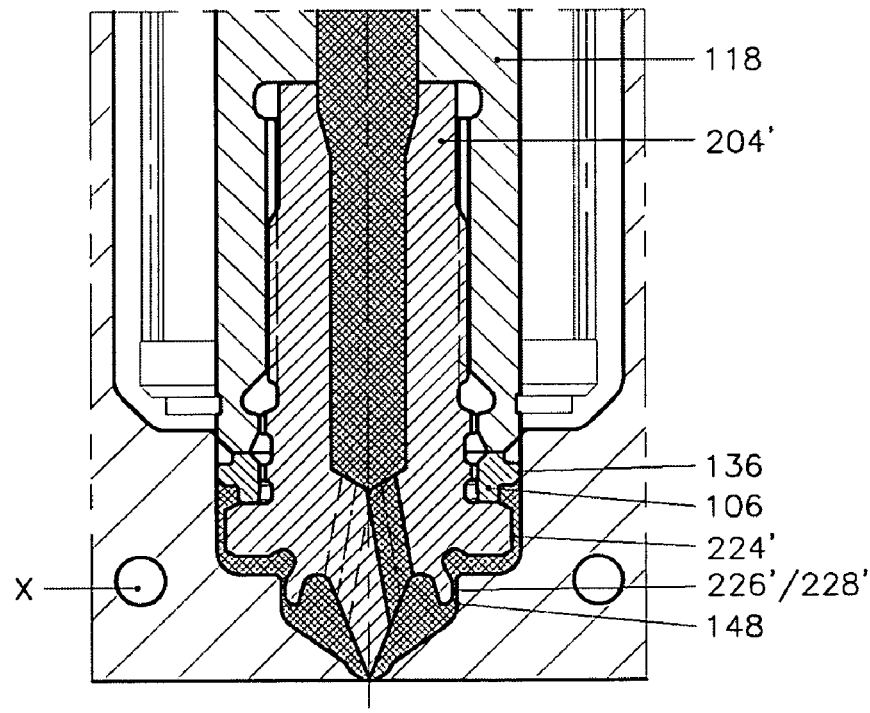
FIG. 4F is an exemplary vertical sectional view of a second embodiment of an injection molding nozzle in accordance with the present invention, showing an assembled two-piece injection molding nozzle having a diverted-flow tip, a modified primary seal (allowing formation of additional insulation) and a conventional sealing surrounding piece providing the secondary seal, used with a conventional nozzle housing, shown in the mold pocket during injection.

FIG. 4F presents a one-piece insert 204' (with a diverted-flow style tip) with a modified primary seal 228' on a reduced cylindrical portion 226', which allows flow of molten plastic around the hexagon portion 224', to the front of the conventional sealing surrounding piece 106, thus creating additional insulation in a manner described above. The secondary seal 136 takes place at the surface of contact between the cylindrical surface of flange 132 of the conventional sealing surrounding piece 106 and the mold pocket 134, similar to the previous designs. If used with the modified sealing surrounding piece 106', it allows the formation of extended additional insulation in a manner already described above.

The one-piece inserts 204, 204' are made of a material with a high thermal conductivity (such as beryllium copper alloys). The conventional sealing surrounding piece 106 (or modified sealing surrounding piece 106') can be made of either the same material as the one-piece inserts, or of a harder, more wear-resistant alloy.

Figure 5:
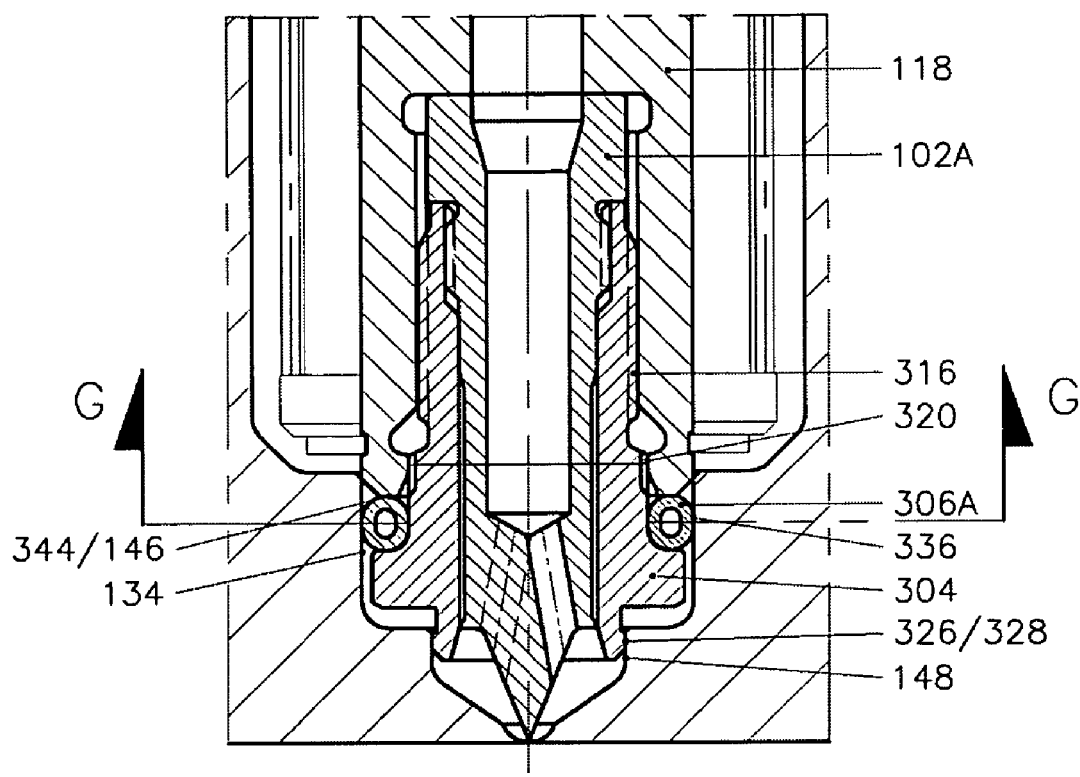
FIG. 5 is an exemplary vertical sectional view of a third embodiment of an injection molding nozzle in accordance with the present invention, showing an assembled three-piece injection molding nozzle having a diverted-flow tip, a conventional primary seal and O-shaped sealing surrounding piece providing the secondary seal, used with a conventional nozzle housing, shown in the mold pocket.
Figure 5A:
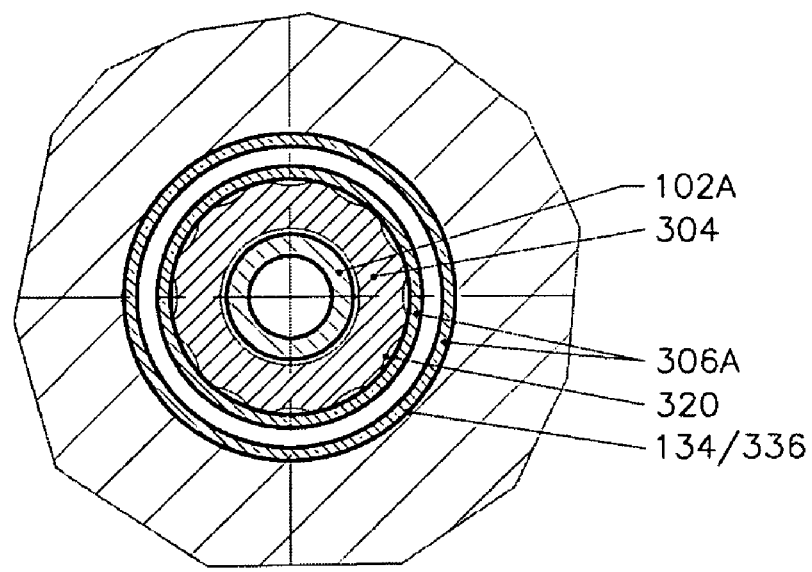
FIG. 5A is an exemplary horizontal sectional view along line G-G of FIG. 5.
Figures 5B, 5D:
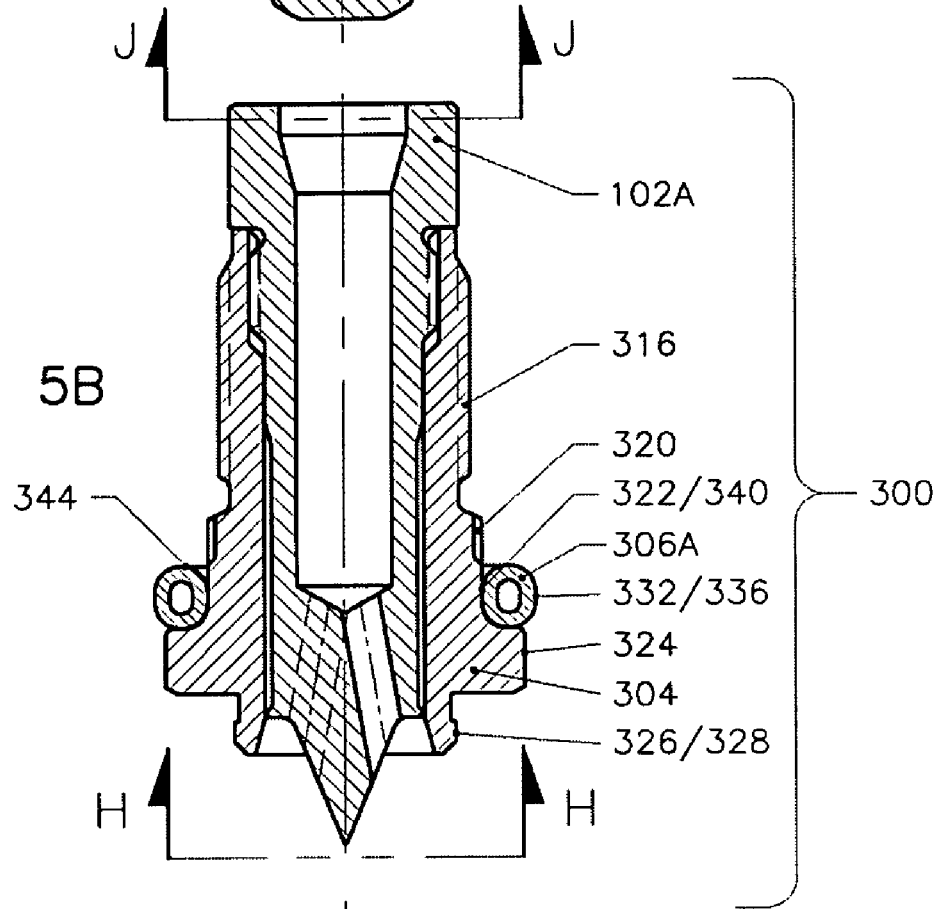
FIG. 5B is an exemplary vertical sectional view of a third embodiment of an injection molding nozzle in accordance with the present invention showing an assembled three-piece injection molding nozzle having a diverted-flow tip, a conventional primary seal and O-shaped sealing surrounding piece providing the secondary seal, for use with conventional nozzle housing, shown removed from the mold pocket.
FIG. 5D is an exemplary horizontal sectional view along line J-J of FIG. 5B.

A third embodiment of the invention is described, with reference to FIG. 5 through 5D. As shown in FIGS. 5 through 5D, this design uses a three-piece nozzle tip 300, made of an inner insert 102A, an outer insert 304 with a conventional primary seal 328, and an O-shaped sealing surrounding piece 306A, for use with a conventional nozzle housing 118. The inner insert 102A is the one used in the first embodiment. The inside of the outer insert 304 is identical with that of the outer insert 104 of the first embodiment. The outside of the outer insert 304 has a threaded portion 316 for engagement in a conventional nozzle housing 118, followed by a scalloped portion 320 for centering in a conventional nozzle housing 118, then a cylindrical portion 322 for centering of O-shaped sealing surrounding piece 306A, a hexagon portion 324 for torque, and a small cylindrical portion 326 which forms the conventional primary seal 328.

The inner and outer inserts are made of the same or similar materials with high thermal conductivity, while the O-shaped sealing surrounding piece is made of either the same or similar material as the inner and outer inserts, or of a harder, more wear-resistant alloy.

This design also has the advantage that the nozzle tip 300 can be stored pre-assembled, for easy and quick installation in the conventional nozzle housing as a compact unit. Contact between the inner surface 340 of the O-shaped sealing surrounding piece 306A and the cylindrical portion 322 of the outer insert 304 ensures centering between these two components. The assembled nozzle tip 300 is then installed in a conventional nozzle housing 118 until the back surface 344 of O-shaped sealing surrounding piece 306A comes into firm contact with the front surface 146 of the conventional nozzle housing. The O-shaped sealing surrounding piece 306A is compressed between the outer insert 304 and the conventional nozzle housing 118, ensuring a leak-proof contact. The outer surface 332 of the O-shaped sealing surrounding piece 306A seals against the mold pocket 134, creating the secondary seal 336.

This embodiment can also be used with flow-through style tip (using inner insert 102B) and valve-gate style tip (using inner insert 102C), and also with the modified primary seal. These options are not shown.

Figure 5E:
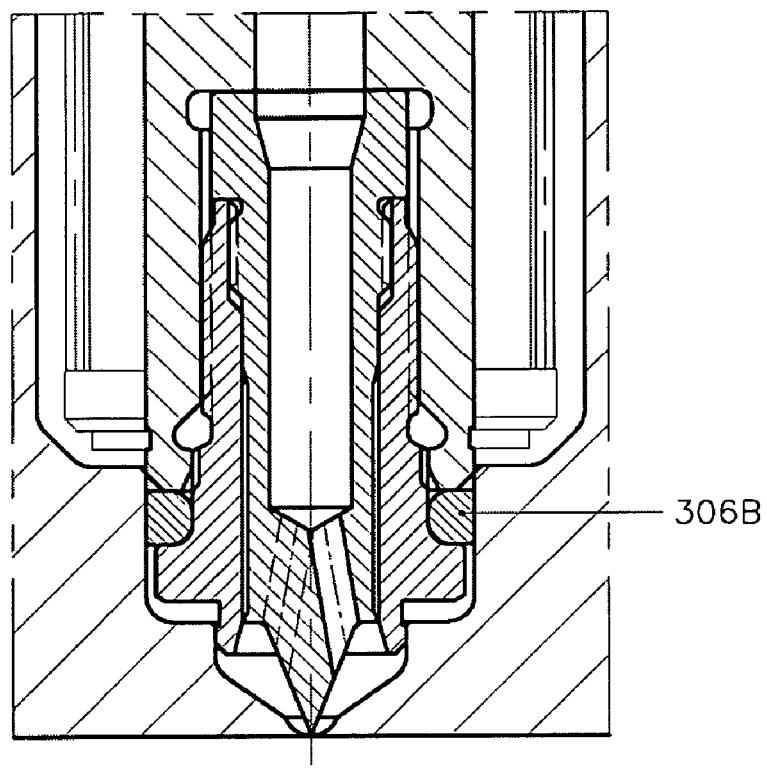
FIG. 5E is an exemplary vertical sectional view of a third embodiment of an injection molding nozzle in accordance with the present invention showing an assembled three-piece injection molding nozzle having a diverted-flow tip, a conventional primary seal and a first alternate design of sealing surrounding piece providing the secondary seal, used with a conventional nozzle housing, shown in the mold pocket.
Figure 5F:
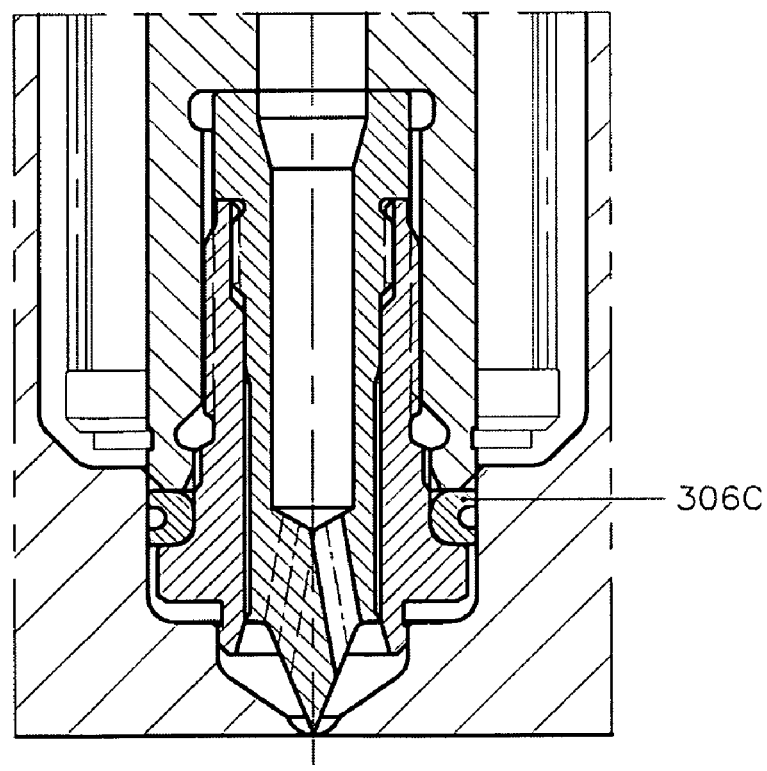
FIG. 5F is an exemplary vertical sectional view of a third embodiment of an injection molding nozzle in accordance with the present invention showing an assembled three-piece injection molding nozzle having a diverted-flow tip, a conventional primary seal and a second alternate design of sealing surrounding piece providing the secondary seal, used with a conventional nozzle housing, shown in the mold pocket.

FIGS. 5E and 5F present alternate designs for the sealing surrounding piece: 306B and 306C respectively. It should be understood that various designs of sealing surrounding piece could be used to achieve a proper secondary seal without departing from the scope of this invention.

The fourth and fifth embodiments present two-piece nozzle tips, formed of an inner insert and an outer insert, used with a modified nozzle housings. These two embodiments offer an alternate mode of reducing thermal loss from the nozzle insert to the nozzle housing, by separating these two items with a "barrier" insert made of a material with very low thermal conductivity.

Figure 6:
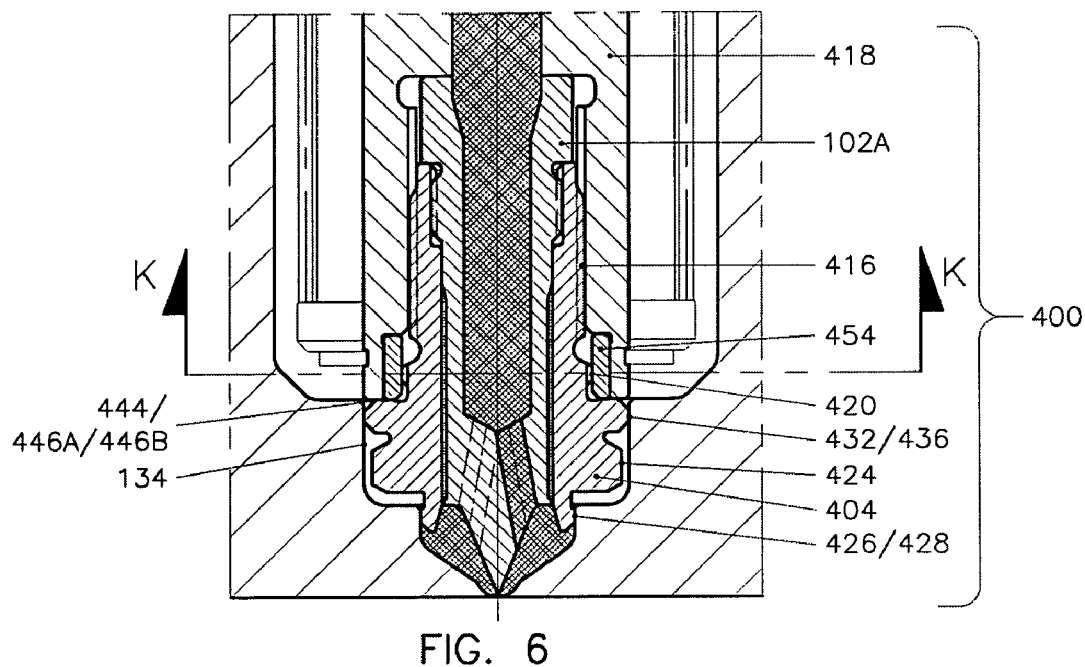
FIG. 6 is an exemplary vertical sectional view of a fourth embodiment of an injection molding nozzle in accordance with the present invention, showing an assembled two-piece injection molding nozzle having a diverted-flow tip and a conventional primary seal, used with a first-modified nozzle housing, shown in the mold pocket during injection.
Figure 6A:
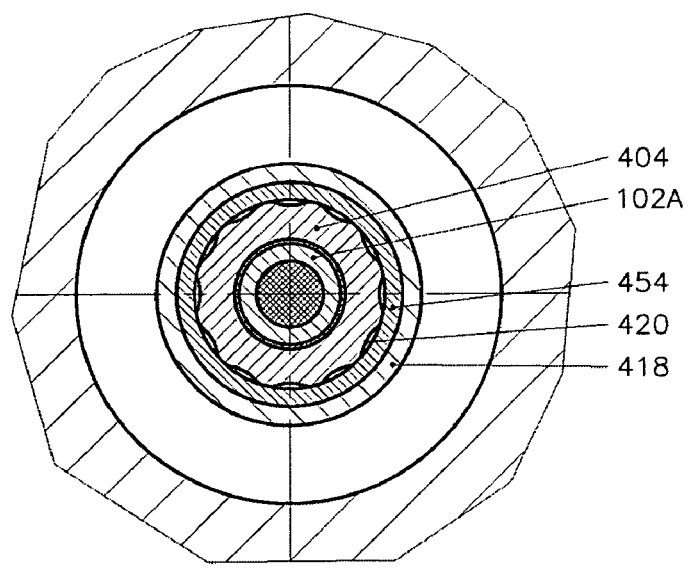
FIG. 6A is an exemplary horizontal sectional view along line K-K of FIG. 6.

FIGS. 6 and 6A show a first-modified nozzle housing 418, presenting a tubular frontal insert 454, installed in a press-fit engagement, in contact—all around its circumference—with the first-modified nozzle housing 418.

The nozzle tip 400 of this embodiment is made of an inner insert 102A (e.g., a diverted-flow style tip, previously described) and an outer insert 404 (with a conventional primary seal 428). The inner and outer inserts are both made of the same or similar materials with high thermal conductivity (such as beryllium copper alloys). The inside of the outer insert 404 is identical with that of outer insert 104 of the first embodiment. The outside of the outer insert 404 has a threaded portion 416 for engagement in the first-modified nozzle housing 418, followed by a scalloped portion 420 for centering in the tubular frontal insert 454 (hence in the first-modified nozzle housing 418), a small cylindrical portion 432 which seals against the mold pocket 134, creating the secondary seal 436, a hexagon portion 424 for torque, and a small cylindrical portion 426, which forms the conventional primary seal 428.

The nozzle tip 400 of this embodiment can be stocked pre-assembled and handled as a compact unit. During installation in the first-modified nozzle housing 418, an open-face or socket wrench is applied to hexagon surface 424, until the back surface 444 of outer insert 404 (behind the secondary seal 436), is in firm contact with the front surface 446A of the first-modified nozzle housing 418 and with the front surface 446B of the tubular frontal insert 454.

This embodiment has all the advantages brought by the previous embodiments, and, in addition, the further reduced heat loss from the nozzle tip to the nozzle housing, which is achieved by manufacturing the tubular frontal insert of a material with very low thermal conductivity, such as ceramic or titanium. Another advantage of the first-modified nozzle housing is its interchangeability with the conventional nozzle housing. The first-modified nozzle housing allows use of all the nozzle tips that can be used with a conventional nozzle housing, such as the previous three embodiments of nozzle tips. The tubular frontal ring is removable and replaceable, which eliminates the need to replace the entire nozzle housing during mold overhauls.

While FIGS. 6 and 6A show this fourth embodiment using a diverted-flow style tip (using inner insert 102A) and conventional primary seal 428, it should be noted that it can also be used with a flow-through style tip (using inner insert 102B) or valve-gate style tip (using inner insert 102C). It also has the option of using an outer insert having a modified primary seal to create additional insulation.

Figure 7:
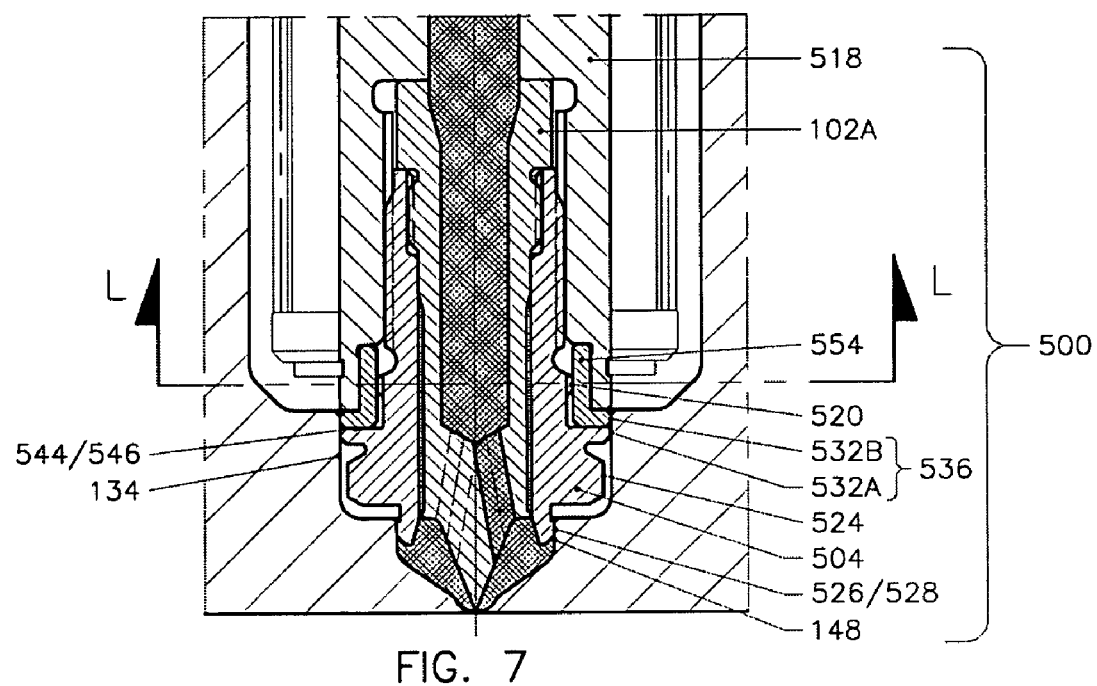
FIG. 7 is an exemplary vertical sectional view of a fifth embodiment of an injection molding nozzle in accordance with the present invention, showing an assembled two-piece injection molding nozzle having a diverted-flow tip and a conventional primary seal, used with a second-modified nozzle housing, shown in the mold pocket during injection.
Figure 7A:
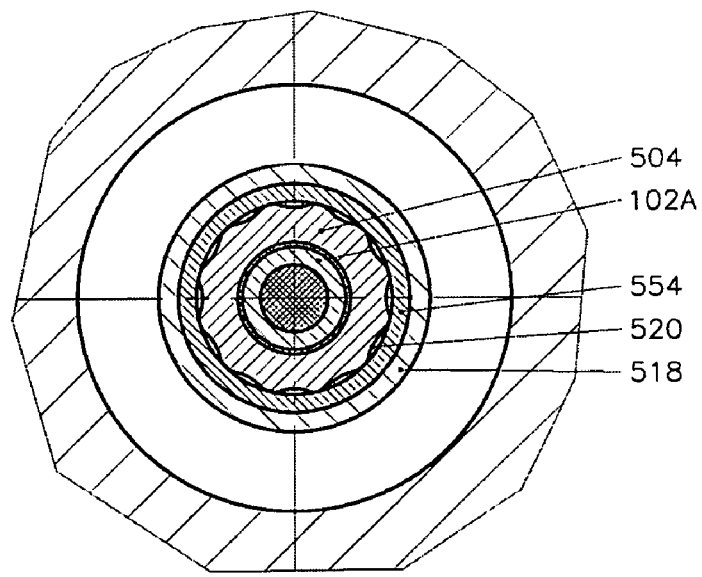
FIG. 7A is an exemplary horizontal sectional view along line L-L of FIG. 7.

A fifth embodiment of the present invention is shown in FIGS. 7 and 7A. A second-modified nozzle housing 518 presents a press-fit flanged frontal insert 554, made of a material with low thermal conductivity, in contact with the nozzle housing all around its circumference and underflange surface.

This embodiment is shown with a diverted-flow style inner insert 102A and conventional primary seal 528, but could also be used with a flow-through style tip (using inner insert 102B) and a valve-gate style tip (using inner insert 102C), and with a modified primary seal. The outer insert 504 of this embodiment is similar to the outer insert 404 of the fourth embodiment save for the portion in contact with the flanged frontal insert 554. The "secondary" seal 536 of this embodiment is a double seal, achieved by both outer insert 504 and flange portion of frontal ring 554. As such, this embodiment presents a triple-seal: the small cylindrical portion 532A of the outer insert 504 achieves the secondary seal, while the adjacent cylindrical portion 532B of the flanged frontal insert 554 achieves the third seal against mold pocket 134. The conventional primary seal 528 created at small cylindrical portion 526, or a modified primary seal (not shown) are similar to the ones of previous embodiments.

Centering between nozzle insert 500 and second-modified nozzle housing 518 takes place at the contact between scalloped portion 520 of outer insert 504 and inner surface of flanged frontal insert 554.

Pre-assembled nozzle insert 500 can be installed in the second-modified nozzle housing 518 by applying torque to hexagon portion 524 of the outer insert 504, and turning until the back surface 544 of the outer insert 504, located behind the small cylindrical surface 532A, is in firm contact with the front surface 546 of the flanged frontal insert 554.

This embodiment has the advantage of allowing a substantial reduction of heat loss from the nozzle tip to nozzle housing, which is achieved by manufacturing the flanged frontal insert of a material with very low thermal conductivity, such a ceramic or titanium. The flanged frontal ring is removable and replaceable, which eliminates the need to replace the entire nozzle housing during mold overhauls.

While FIGS. 7 and 7A show a nozzle insert with conventional primary seal 528, achieved by the small cylindrical portion 526 of the outer insert 504, this design can also be used with a modified primary seal, which would allow flow of molten plastic to the front of the "secondary" seal, achieving additional, extended insulation.

This embodiment can also be used with the flow through style tip (using inner insert 102B) and a valve-gate style tip (using inner insert 102C).

As will be understood by those skilled in the art, the present invention may be embodied in other specific forms without departing from the essential characteristics thereof. For example, any of the nozzle embodiments may have either a diverted-flow, a flow through, or a valve gate style tip. In addition, the features of each of the nozzle embodiments described above may be combined with one another to create other alternate embodiments. These other embodiments are intended to be included within the scope of the present invention, which is set forth in the following claims.

What is claimed is:

1. An injection molding nozzle, comprising:
   an inner insert;
   an outer insert; and
   a sealing surrounding piece,
   wherein on the outside the outer insert has a threaded
      portion for engagement in a nozzle housing, followed by a first scalloped portion for centering in the nozzle housing, a second scalloped portion for centering of the sealing surrounding piece, a portion shaped for torque, and a small cylindrical portion which forms a primary seal against the mold pocket, wherein the back end of the inner insert has a shape designed for torquing, and wherein the inner insert is configured to be threadably engaged in the outer insert, on the inside, the inner insert has a large central duct for the delivery of molten plastic, and wherein the sealing surrounding piece is configured to become compressed between the outer insert and the nozzle housing as the outer insert is tightened in the nozzle housing to create an axial seal, which sealing surrounding piece has an outer portion configured to contact the mold pocket, so as to create a leak-proof secondary seal, on the inside, the sealing surrounding piece has a slightly tapered, guide-in portion, followed by a cylindrical portion, where contact between the outer insert's second scalloped portion and the inner cylindrical portion of the sealing surrounding piece ensures centering between these two components.

2. The injection molding nozzle of claim 1 wherein said inner and outer inserts are made of the same or similar thermal conductivity material.

3. The injection molding nozzle of claim 1 wherein said inner and outer inserts are made of materials having different thermal conductivities.

4. The injection molding nozzle of claim 1 wherein said sealing surrounding piece is made of a more wear-resistant material than the inner and outer inserts.

5. The injection molding nozzle of claim 1 wherein said sealing surrounding piece is made of a less wear-resistant material than the mold insert, against which said sealing surrounding piece seals, so as to protect the mold insert against wear at the secondary seal.

6. The injection molding nozzle of claim 1 wherein said outer insert is modified to have a reduced small cylindrical portion, so as to modify the primary seal to allow the flow of molten plastic under injection pressure to travel upward and fill the mold chamber space between the mold pocket and the nozzle, such that when solidified and/or semi-solidified, the molten plastic in said space provides additional thermal insulation.

7. The injection molding nozzle of claim 6 wherein said sealing surrounding piece is modified to include a number of grooves machined onto the portion of the sealing surrounding piece that is in contact with outer insert, so as to allow the molten plastic to reach even further upward past the scalloped profiles, reaching to the beginning of the threaded engagement between the outer insert and the nozzle housing, thus creating an extended additional insulator.

8. The injection molding nozzle of claim 1 wherein said sealing surrounding piece has an outer flanged portion, achieving said secondary seal at the contact between the outer surface of the flanged portion and the mold pocket.

9. The injection molding nozzle of claim 1 wherein said sealing surrounding piece has a tubular, O-shaped section, achieving said secondary seal at the contact between the O-shaped sealing surrounding piece and the mold pocket.

10. The injection molding nozzle of claim 1 wherein said sealing surrounding piece has a solid section, achieving said secondary seal at the contact between the outer surface of the solid sealing surrounding piece and the mold pocket.

11. The injection molding nozzle of claim 1 wherein said sealing surrounding piece has a C-shape section, achieving a double secondary seal at the contact between the outer surfaces of the C-shaped sealing surrounding piece and the mold pocket.

12. The injection molding nozzle of claim 1 wherein said sealing surrounding piece is of a shape having at least one outer surface configured to achieve said secondary seal at the contact between said outer surface and the mold pocket.

13. An injection molding nozzle, comprising:
a nozzle insert; and
a sealing surrounding piece,
wherein the nozzle insert has a cylindrical portion, which on the outside is followed by an outer thread, a first scalloped portion for centering in a nozzle housing, a second scalloped portion for centering of the sealing surrounding piece, a hexagon portion for torque, a small cylindrical portion which forms the primary seal with a mold pocket, followed by a conical end, and on the inside, the nozzle insert has a large central duct for the delivery of molten plastic, and wherein the sealing surrounding piece is configured to become compressed between the nozzle insert and the nozzle housing as the nozzle insert is tightened in the nozzle housing to create an axial seal, which sealing surrounding piece has an outer portion configured to contact the mold pocket, so as to create a leak-proof secondary seal.

14. The injection molding nozzle of claim 13 wherein said sealing surrounding piece is made of a more wear-resistant material than the nozzle insert.

15. The injection molding nozzle of claim 13 wherein said nozzle insert is made of a high thermal conductivity material.

16. The injection molding nozzle of claim 13 wherein said nozzle insert is modified to have a reduced small cylindrical portion, so as to modify the primary seal to allow the flow of molten plastic under injection pressure to travel upward and fill the mold chamber space between the mold pocket and the nozzle up to the front of the sealing surrounding piece, such that the solidified molten plastic in said space provides additional thermal insulation.

17. The injection molding nozzle of claim 13 wherein said sealing surrounding piece has an outer flanged portion, achieving said secondary seal at the contact between the outer surface of the flanged portion and the mold pocket.

18. The injection molding nozzle of claim 13 wherein said sealing surrounding piece has a tubular, O-shaped section, achieving said secondary seal at the contact between the O-shaped sealing surrounding piece and the mold pocket.

19. The injection molding nozzle of claim 13 wherein said sealing surrounding piece has a solid section, achieving said secondary seal at the contact between the outer surface of the solid sealing surrounding piece and the mold pocket.

20. The injection molding nozzle of claim 13 wherein said sealing surrounding piece has a C-shape section, achieving a double secondary seal at the contact between the outer surfaces of the C-shaped sealing surrounding piece and the mold pocket.

21. The injection molding nozzle of claim 13 wherein said sealing surrounding piece is of a shape having at least one outer surface configured to achieve said secondary seal at the contact between said outer surface and the mold pocket.

22. An injection molding nozzle, comprising:
an inner insert;
an outer insert; and
a tubular frontal ring,
wherein the back end of the inner insert has a shape designed for torquing, and wherein the inner insert is configured to be threadably engaged in the outer insert, and on the inside, the inner insert has a large central duct for the delivery of molten plastic, and wherein the outer insert on the outside, has a threaded portion for engagement in a nozzle housing, followed by a scalloped portion for centering in the tubular frontal ring, a small cylindrical portion which seals against a mold pocket, creating a secondary seal, a hexagon portion for torque, and a second small cylindrical portion, which forms the primary seal with the mold pocket.

23. The injection molding nozzle of claim 22 wherein said tubular frontal ring is made of material having a lower thermal conductivity than said inner or outer inserts.

24. The injection molding nozzle of claim 22 wherein the tubular frontal ring is removable.

25. The injection molding nozzle of claim 22 wherein the tubular frontal ring is configured to become compressed between the outer insert and the nozzle housing as the nozzle insert is tightened in the nozzle housing to create an axial seal.

26. An injection molding nozzle, comprising:
an inner insert;
an outer insert; and
a flanged frontal ring,
wherein the back end of the inner insert has a shape designed for torquing, and wherein the inner insert is configured to be threadably engaged in the outer insert, and on the inside, the inner insert has a large central duct for the delivery of molten plastic, and wherein the outer insert on the outside, has a threaded portion for engagement in a nozzle housing, followed by a scalloped portion for centering in the flanged frontal ring, a small cylindrical portion which seals against a mold pocket, creating a secondary seal, a hexagon portion for torque, and a second small cylindrical portion, which forms the primary seal with the mold pocket, and wherein the cylindrical portion of the flanged frontal ring forms a third seal against the mold pocket.

27. The injection molding nozzle of claim 26 wherein said flanged frontal ring is made of material having a lower thermal conductivity than said inner or outer inserts.

28. The injection molding nozzle of claim 26 wherein said flanged frontal ring is removable.

29. The injection molding nozzle of claim 26 wherein the flanged frontal ring is configured to become compressed between the outer insert and the nozzle housing as the nozzle insert is tightened in the nozzle housing to create an axial seal.

* * * * *